(12) United States Patent
Hochstein

(10) Patent No.: US 6,596,978 B2
(45) Date of Patent: Jul. 22, 2003

(54) STEREO IMAGING RAIN SENSOR

(75) Inventor: Peter A. Hochstein, Troy, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 238 days.

(21) Appl. No.: 09/894,340

(22) Filed: Jun. 28, 2001

(65) Prior Publication Data

US 2001/0042822 A1 Nov. 22, 2001

(51) Int. Cl.$^7$ .............................. B60S 1/08; G05B 5/00
(52) U.S. Cl. ................ 250/208.1; 250/573; 318/483; 340/602
(58) Field of Search ................... 250/208.1, 227.25, 250/573, 574; 318/483, DIG. 2; 340/602, 603, 604; 15/DIG. 15; 361/286

(56) References Cited

U.S. PATENT DOCUMENTS

| 4,164,868 A | 8/1979 | Suntola ................ 73/336.5 |
| 4,429,343 A | 1/1984 | Freud ................... 361/286 |
| 4,476,419 A | 10/1984 | Fukatsu et al. ............. 318/444 |
| 4,595,866 A | 6/1986 | Fukatsu et al. ............. 318/444 |
| 4,636,643 A | 1/1987 | Nakamura et al. .......... 250/338 |
| 4,639,831 A | 1/1987 | Iyoda ................... 361/286 |
| 4,676,638 A | 6/1987 | Yasuda ................. 356/237 |
| 4,805,070 A | 2/1989 | Koontz ................. 361/286 |
| 4,827,198 A | 5/1989 | Mueller et al. ............ 318/483 |
| 4,831,493 A | 5/1989 | Wilson et al. ............. 361/286 |
| 5,313,072 A | 5/1994 | Vachss ................. 250/573 |
| 5,537,003 A | 7/1996 | Bechtel et al. ............. 315/82 |
| 5,668,478 A | 9/1997 | Buschur ................ 324/693 |
| 5,923,027 A | 7/1999 | Stam et al. ............. 250/208.1 |
| 6,020,704 A | 2/2000 | Buschur ................ 318/483 |
| 6,144,022 A * | 11/2000 | Tenenbaum et al. ..... 250/208.1 |

FOREIGN PATENT DOCUMENTS

| DE | 19929964 A | 1/2001 |
| JP | 9189533 | 7/1997 |
| WO | WO 99 38737 A | 8/1999 |

* cited by examiner

Primary Examiner—Kevin Pyo
(74) Attorney, Agent, or Firm—Howard & Howard

(57) ABSTRACT

Two embodiments include a first image sensor (14, 114) for sensing a first image of the exterior surface of the glass (12) along a first optical axis A and a second image sensor (16, 116) for sensing a second image of the exterior surface of the glass (12) along a second optical axis B which intersects the first optical axis A at an intersection X disposed adjacent the exterior surface of the glass (12). Both embodiments include an image correlator (22) for correlating the first and second images and producing an activation signal (24) in response to coincidence of moisture (10) in the respective correlated first and second images. The rain sensor accurately interprets images of moisture that lie in a narrow measurement zone adjacent the exterior surface of the windshield while disregarding images of objects that lie outside that zone.

10 Claims, 2 Drawing Sheets

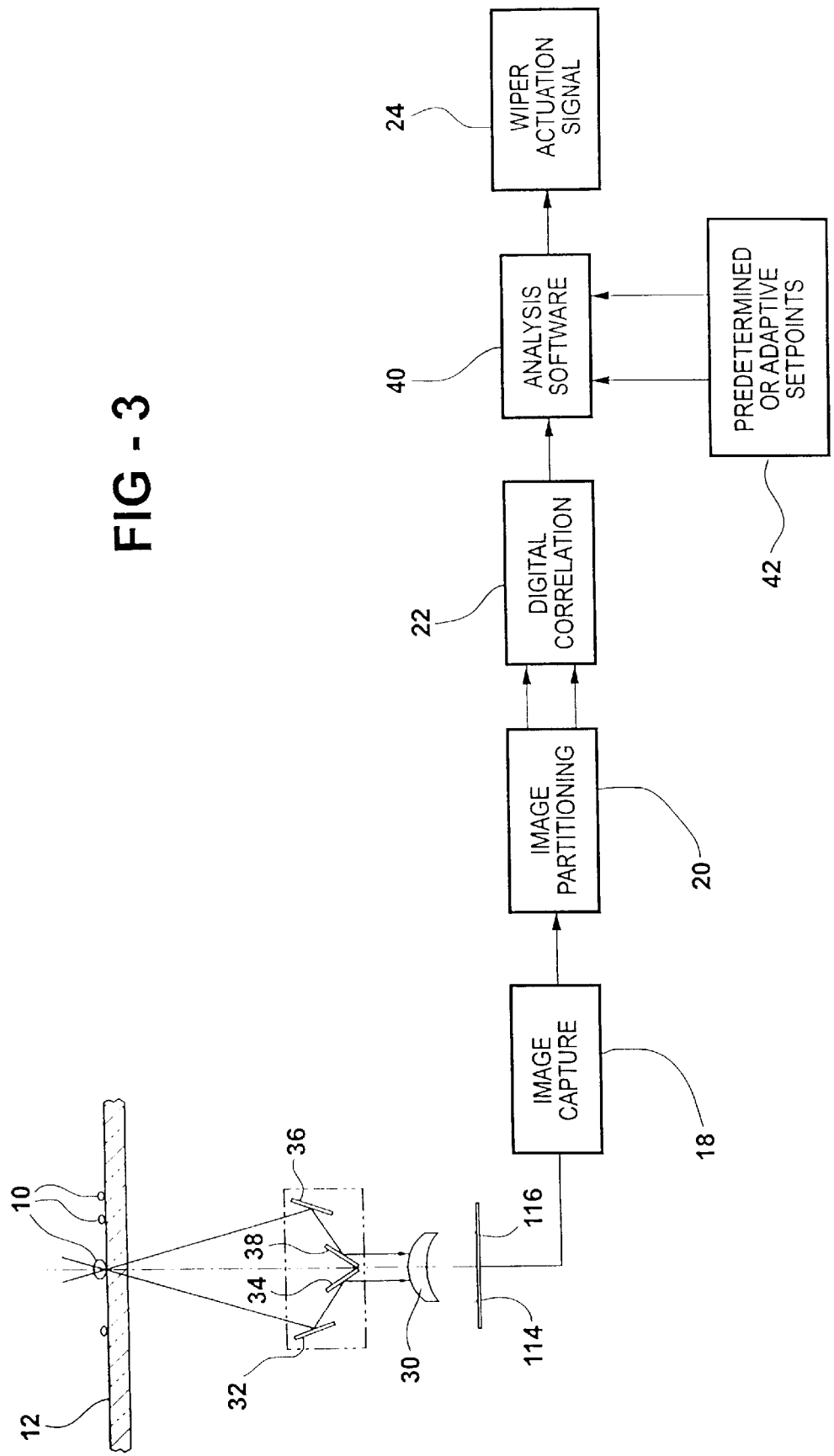

STEREO IMAGING RAIN SENSOR

RELATED APPLICATION

This application is an improvement over application Ser. No. 09/267,867 filed Mar. 12, 1999 (attorney docket 65165.004) and issued patents, U.S. Pat. No. 6,094,981, which issued Aug. 1, 2000 (attorney docket 65165.001); U.S. Pat. No. 6,207,967 which issued Mar. 27, 2001 (attorney docket 65165.002); U.S. Pat. No. 6,144,022 which issued Nov. 7, 2000 (attorney docket 65165.003); and U.S. Pat. No. 6,049,069 which issued Apr. 11, 2000 (attorney docket 65165.005) and assigned to the assignee of the subject invention.

BACKGROUND OF THE INVENTION

1. Field of the Invention

The subject invention relates to an assembly for sensing moisture on a sheet of glass and, more particularly, to a rain sensor for detecting rain on the windshield of an automotive vehicle to turn on the wipers.

2. Description of the Prior Art

The sensing of rain or moisture on the windshield of a vehicle for automatically controlling wiping systems has become a popular driver convenience item in the last several years. With such automation, drivers can be more focused on the road than on the manual setting of the windshield wiper controls. Traditional wiper controls are typically preset to one of several speeds, and/or the wipe rate interval is set according to the rainfall rate. Of course as the rainfall (rate) increases or decreases the proper setting to maintain a nominally clear windshield varies, and, therefore, necessitates frequent driver adjustment.

Such fully automatic, rain sensing, wiper control systems continually monitor the rain that is falling on the windshield, and respond by adjusting the wiping interval to match the rain-fall rate.

Several methods have been used to achieve such automatic wiper control and, for the most part, such methods differ only in the rain sensing detectors that are employed. That is, the rain-sensing element is generally adapted to work with or control existing interval (timed) wiping systems. The most common rain or moisture sensing detectors have been based on either the optical or the electrical properties of water. These include the prior art devices shown in U.S. Pat. No. 5,923,027 to Stam, et al, U.S. Pat. No. 6,020,704 to Buschur and in applicants copending applications set forth above.

The moisture variants that must be detected include water film, drops, mist, fog, snow, ice, etc. the most important aspect of any moisture detection system is the accuracy in the detection of the moisture. In other words, the system needs to detect moisture on the windshield while being resistant to false triggering by spurious signals, i.e., non-moisture, lights and other objects.

SUMMARY OF THE INVENTION AND ADVANTAGES

The subject invention provides an assembly for sensing moisture on the exterior surface of a sheet of glass comprising a first image sensor for sensing a first image of the exterior surface of the glass along a first optical axis and a second image sensor for sensing a second image of the exterior surface of the glass along a second optical axis which intersects the first optical axis at an intersection disposed adjacent the exterior surface of the glass. An image correlator is included for correlating the first and second images and producing an activation signal in response to coincidence of moisture in the respective correlated first and second images.

The invention also includes a method for sensing moisture on the exterior surface of a sheet of glass comprising the steps of viewing the exterior surface of the glass along a first optical axis to produce a first image, viewing the exterior surface of the glass along a second optical axis which intersects the first optical axis at an intersection disposed adjacent the exterior surface of the glass to produce a second image, correlating the first and second images, and producing an activation signal in response to coincidence of moisture in the respective correlated first and second images.

Accordingly, the invention addresses the rain or moisture selectivity problem by critically limiting activation of the wiper system to essentially the exterior surface of the windshield only. In other words, artifacts or extraneous, light sources or other objects that appear outside the monitored or in a focus zone on the exterior surface of the windshield are disregarded by the subject invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is block diagram of the second embodiment.

DETAILED DESCRIPTION OF THE PREFERRED EMBODIMENT

Figure 2:
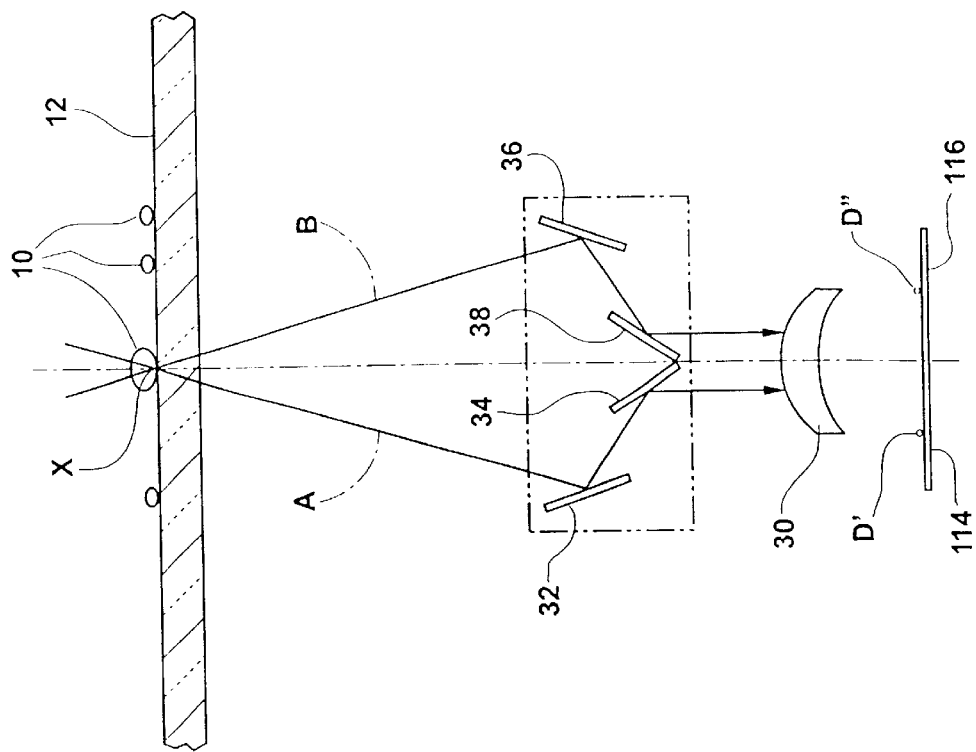
FIG. 2 is a schematic view of a second embodiment of the invention.
Figure 1:
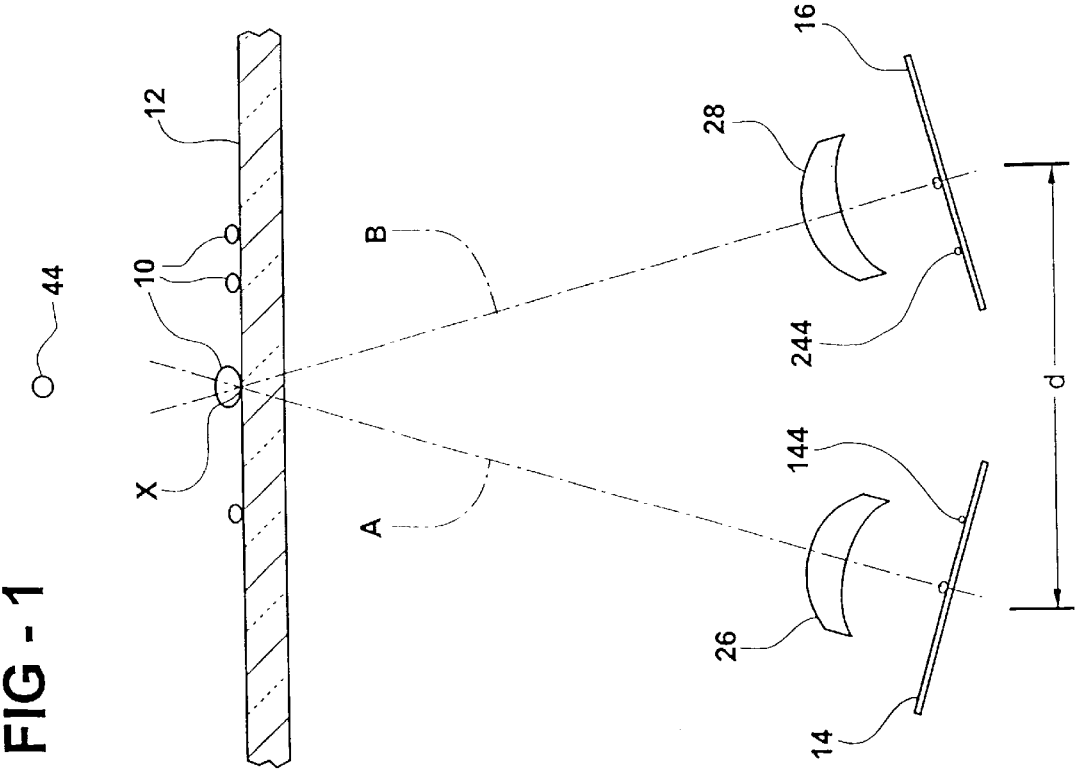
FIG. 1 is a schematic view of a first embodiment of the invention.

Referring to the Figures, wherein like numerals indicate like or corresponding parts throughout the several views, an assembly for sensing moisture 10 on the exterior surface of a sheet of glass 12 is shown in a first embodiment in FIG. 1 and in a second embodiment in FIGS. 2 and 3.

Each embodiment includes a first image sensor 14, 114 for sensing a first image of the exterior surface of the glass 12 along a first optical axis A. In addition, each embodiment includes a second image sensor 16, 116 for sensing a second image of the exterior surface of the glass 12 along a second optical axis B which intersects the first optical axis A at an intersection X disposed adjacent the exterior surface of the glass 12. In the first embodiment, the image sensors 14 and 16 are separate focal plane detectors whereas the image sensors 114 and 116 in the second embodiment are defined by a single focal plane detector which may be physically divided into two parts or partitioned in software, as shown at 18 and 20 in FIG. 3.

Both embodiments include an image correlator 22 for correlating the first and second images and producing an activation signal 24 in response to coincidence of moisture 10 in the respective correlated first and second images.

A lens system is included for focusing the intersection X of the optical axes onto the first 14, 114 and second 16, 116 image sensors to produce the first and second images. In the first embodiment, the lens system includes a first lens 26 for focusing the view along the first optical axis A onto the first image sensor 14 and a second lens 28 for focusing the view along the second optical axis B onto the second image sensor 16. However, since a single plane sensor 114, 116 is used in the second embodiment, the lens system includes a single lens 30 and a first mirror system comprising mirrors 32 and 34 for focusing the view along the first optical axis A onto the first image sensor 114 and a second mirror system comprising the mirrors 36 and 38 for focusing the view along the second optical axis B onto said second image sensor 116. As will be appreciated, the mirror may comprise prisms or any device that reflects the beam of light.

Accordingly, acquisition of images from two slightly different points of view may be accomplished by using the stereoscopic adaptor as shown in FIG. 2. These devices are commonly used to convert ordinary photographic cameras into stereoscopic cameras. They do so by essentially splitting each film negative into two equal parts, e.g., a left and a right portion, each of which captures a slightly different view of the same object. Of course, the purpose of such a device is to convey the illusion of depth to the viewed image. By using a simple system of mirrors or prisms these stereographic converters allow one lens 30 to image both requisite views. Experiments with such devices show that one low cost imager (focal plane array) may be used to capture both views simultaneously in a conveniently compact package. The focal plane array 114, 116 would be effectively divided into two sensors, each of which provides a different view of the subject, i.e., the moisture 20 on the exterior surface of the glass. This partitioning may be vertical or horizontal with the latter being the preferred geometry, horizontal stereo topologies permit simple adaptation of Scheimpfliug correction methods to maintain image focus over the entire angled field of view. FIG. 3. Shows a basic block diagram of an off the glass, imaging rain sensor using stereo vision. A simple image sensor 114, 116 (focal plane array) is used to capture both images simultaneously, by partitioning the sensor in software 20. These images are stored and compared in a digital correlator 22 to establish spatial coincidence for the imaged elements. The level of correlation between the two image frames is then used to decide whether the wiping system should be activated. More sophisticated algorithms could be used to determine if dirt were present on the windshield and whether windshield washer solvent should be applied.

A processor 40 is included for analyzing the correlated images and establishing predetermined set points 42 of coincidences as a precondition for producing said activation signal 24.

As will be appreciated, the limiting of system response to objects that fall within a well-defined distance from the imaging camera lens may be accomplished by using stereo imaging techniques. Such stereo imaging has a long history in photography and 'stereopticon' images were commonplace in the late part of the nineteenth century. These stereo photographs were produced by imaging a subject from two or more slightly different horizontal positions, and then viewing the images through a special viewing device that allowed each eye to see the original subject from a slightly different perspective thereby providing the illusion of depth or three dimensional realism.

In a similar fashion, multiple images may be created on a solid state, focal plane imager to provide depth of field information. These two separate images of the same subject may be created by using two lenses 26 and 28 and two images 14 and 16, or one lens 30 and an optical image splitter 114, 116.

The only requirement for using this two image technique for rain sensing is that the two images of the same subject 10 (object) be acquired from two slightly different angles of view, e.g., axes A and B. Unlike traditional stereo photography, the generation of an illusion of depth is unnecessary and the sighting baseline is unrelated to human vision requirements. As illustrated in FIG. 1, the differential viewing angle between the axes A and B of the present invention is only necessary to derive depth of field information. That is, the use of stereographic principals permits the rain sensor of the present invention to accurately interpret images of objects that lie in narrow measurement zone, disregarding images of objects that lie outside that zone.

In a sense, the application of the two image forming systems, separated by a given baseline is similar to the principal of coincident image range-finding. This well-known optical distance determining method is employed in disparate fields from military artillery to range finder cameras. Such traditional range finders determine distance by accurately measuring the optical intercept angle between two viewing positions, separated by an accurately known baseline or offset. Rather than measure the distance from the object to the instrument, the stereo vision rain sensor fixes the standoff distance, baseline (offset) and included viewing angle to unambiguously localize objects at a certain distance. Said a different way, only objects that appear within a given, narrowly defined area will be correlated spatially in the two separate views of the monitored area.

As shown in FIG. 1, two imaging systems separated by some nominal baseline distance (d) are disposed so as to view (monitor) a given area on the windshield. In the example shown, each imager 14 and 16 is provided with it's own imaging optic, but as illustrated in FIGS. 2 and 3, one lens 30 may also be used. The important and necessary feature of the invention is that the optical axis for each of the two or more viewing angles A and B intersect X.

While this point of intersection X is shown to lie on the exterior surface of the glass 12, it may, in fact, lie outside the glass for convenience, i.e., adjacent the exterior surface of the glass 12. Moving the intercept or intersection X off the glass simply requires a correction offset adjustment in the image analysis software 40. For purposes of explanation and simplicity the intercept X of the two (or more) viewing axes A and B is illustrated as on the glass.

Assuming a suitably chosen, overlapping field of view for each imager, the presence of water drops 10 or other material lying on the outer windshield surface will be imaged on each focal plane array 14, 114 and 16, 116. For purposes of explanation, a rain drop 10 is present at the intersection X of the axes A and B on the exterior surface of the glass 12, i.e., at a location that is coincident with both optical axes A and B. Such a position X would place the image of that raindrop 10 in the center of the first image sensor 14, 114 and the second image sensor 16, 116. That is, the correlation of the images would be virtually perfect; i.e., the image of the raindrop 10 at the intersection X on each focal plane array would be nearly identical. Of course, other objects within the field of view would also show excellent correlation if they lie on the outer windshield surface. While there will be some geometric distortion due to the shift in perspective, the imaged objects can be correlated easily. Variances in magnification due to the baseline offset and differences in viewing angle may be compensated for in software 40.

In order to facilitate system installation and to establish accurately overlapping fields of view, one could imprint one or more small fiducial marks on the windshield. These marks would constitute reference points in each field of view, and could be the basis for an adaptive correlation process that did not require accurate positioning or placement of each imager system.

Referring to FIG. 1., an interfering artifact 44 is illustrated within the rain sensor field of view. This artifact 44 may be a small, bright light source or reflection that might otherwise interfere with rain droplet detection. If the artifact 44 does not lie on the outer windshield surface (which is likely) the position of the image of the artifact 44, as projected onto each focal plane image sensor 14 and 16 will be slightly different. As shown, the disposition 144 of the image of the artifact 44 on the first image sensor 14 would be imaged slightly to the right of the centered image of the raindrop 10 on the first image sensor 14 and the disposition 244 of the image of the artifact 44 slightly to the left of centered image of the raindrop 10 on the second image sensor 16. The reversal of position is due to the imagining lenses. The result of such stereographic imaging is that images of possible interfering objects or light sources are not correlated in the two views, i.e., the disposition of these artifacts 144 and 244 appear in different parts of the image frame. Bona fide water droplets that lie on the outer glass surface are well correlated however and may be correctly identified as rain. Correlation of the two images, which are acquired essentially simultaneously, may be accomplished most expeditiously by means of the digital correlator 22. This correlator 22 may be configured as hardware, or more conveniently as software. Such software would, in general compare pixel luminance values in the two image frames 14, 114 and 16, 116, and determine coincidence. Various weighting parameters would be employed to adjust for the expected slight variances in the two views, and a series of setpoints or trigger levels 42 could be established to initiate windshield wiping. Naturally, various forms of filtering in the frequency and time domain could be used to optimize system response and rain sensitivity.

It should be noted that the present invention may be used to image the native raindrops or other moisture as well as the specular reflection or refraction from the drops. In most instances, outside illumination (daylight) will give rise to refracted light images while internal (ancillary I.R.) Illumination will give rise to specular reflective images.

As will be appreciated the present invention provides a method for sensing moisture 10 on the exterior surface of a sheet of glass 12 comprising the steps of viewing the exterior surface of the glass 12 along a first optical axis A to produce a first image 14, 114, and viewing the exterior surface of the glass 12 along a second optical axis B which intersects the first optical axis A at an intersection X disposed adjacent the exterior surface of the glass 12 to produce a second image 16, 116. This is combined with the steps of correlating the first and second images and producing an activation signal 24 in response to coincidence of moisture 10 in the respective correlated first 14, 114 and second 16, 116 images. The correlating is accomplished digitally and predetermined set points 42 of coincidences are established as a precondition for producing the activation signal 24.

The method includes focusing the intersection X of the optical axes onto first 14, 114 and second 16, 116 image sensors to produce the first and second images. More specifically, the focusing of the intersection X of the optical axes may be through a first lens 26 and unto a first image sensor 14 and through a second lens 28 onto a second image sensor 16 to produce the respective first and second images. Alternatively, the focusing the intersection X of the optical axes may be through a single lens 30 and unto a first image sensor 114 and through the single lens 30 onto a second image sensor 116 to produce the respective first and second images. In this case, the step may include viewing along at least one of the optical axes through at least one mirror, e.g. viewing along the first optical axis A through a first mirror system 32, 34 and viewing along the second optical axis B through a second mirror system 36, 38.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method for sensing moisture (10) on the exterior surface of a sheet of glass (12) comprising the steps of;

viewing the exterior surface of the glass (12) along a first optical axis A to produce a first image, viewing the exterior surface of the glass (12) along a second optical axis B which intersects the first optical axis A at an intersection X disposed adjacent the exterior surface of the glass (12) to produce a second image, correlating the first and second images, producing an activation signal (24) in response to coincidence of moisture (10) in the respective correlated first and second images, and viewing along at least one of the optical axes through at least one mirror.

2. A method as set forth in claim 1 including focusing the intersection X of the optical axes onto first (14, 114) and second (16, 116) image sensors to produce the first and second images.

3. A method as set forth in claim 1 further defined as digitally correlating the first and second images, and analyzing the correlated images and establishing predetermined set points (42) of coincidences as a precondition for producing the activation signal (24).

4. A method as set forth in claim 1 including focusing the intersection X of the optical axes through a first lens (26) and unto a first image sensor (14, 114) and through a second lens (28) onto a second image sensor (16, 116) to produce the respective first and second images.

5. A method as set forth in claim 1 including focusing the intersection X of the optical axes through a first lens (26) and unto a first image sensor (14, 114) and through the first lens (26) onto a second image sensor (16, 116) to produce the respective first and second images.

6. A method as set forth in claim 5 further defined as viewing along the first optical axis A through a first mirror system and viewing along the second optical axis B through a second mirror system.

7. An assembly for sensing moisture (10) on the exterior surface of a sheet of glass (12) comprising;

a first image sensor (14, 114) for sensing a first image of the exterior surface of the glass (12) along a first optical axis A, a second image sensor (16, 116) for sensing a second image of the exterior surface of the glass (12) along a second optical axis B which interests the first optical axis A at an intersection X disposed adjacent the exterior surface of the glass (12), an image correlator (22) for correlating the first and second images and producing an activation signal (24) in response to coincidence of moisture (10) in the respective correlated first and second images, and said lens system including a single lens (30) and a first mirror system for focusing the view along said first optical axis A onto said first image sensor (14, 114) and a second mirror system for focusing the view along said second optical axis B onto said second image sensor (16, 116).

8. An assembly as set forth in claim 7 including a lens system for focusing the intersection X of the optical axes onto said first (14, 114) and second (16, 116) image sensors to produce the first and second images.

9. An assembly as set forth in claim 8 wherein said lens system includes a first lens (26) for focusing the view along said first optical axis A onto said first image sensor (14, 114) and a second lens (28) for focusing the view along said second optical axis B onto said second image sensor (16, 116).

10. An assembly as set forth in claim 7 wherein said correlator (22) comprises a digital correlator (22) for digitally correlating the first and second images, and a processor (40) for analyzing the correlated images and establishing predetermined set points (42) of coincidences as a precondition for producing said activation signal (24).

* * * * *